United States Patent Office 3,141,851
Patented July 21, 1964

3,141,851
PROCESS FOR IMPROVING THE STABILITY OF SILVER SALT SOLUTIONS TO REDUCING AGENTS
Ulrich Schwenk and Erich Schneck, Frankfurt am Main, Germany, assignors to Farbwerke Hoechst Aktiengesellschaft vormals Meister Lucius & Brüning, Frankfurt am Main, Germany, a company of Germany
No Drawing. Filed June 21, 1960, Ser. No. 37,551
Claims priority, application Germany June 26, 1959
6 Claims. (Cl. 252—184)

It is known that salts of heavy metals, for instance of silver, copper, and mercury, are capable of adsorbing olefins. Particularly silver salt solutions show a very high solubilizing capacity with regard to olefins even under normal pressure. It has been recommended, for example, to use aqueous solutions of silver fluoborate or silver fluosilicate for the selective separation of olefins. In addition to their high adsorptive capacity for olefins the silver solutions are characterized by being completely insensitive to oxygen and carbon dioxide. Carbon monoxide is only sparingly soluble in them. Small amounts of hydrogen likewise do not exert any influence on these silver salts. It has now been found that hydrogen in a higher concentration and under elevated pressure slowly separates silver from the solutions already at room temperature. To a much reduced extent a precipitation of silver takes place likewise with carbon monoxide and higher olefins. This precipitation of silver occurs in the aqueous and anhydrous solutions of silver fluoborate as well as with silver nitrate and other silver salt solutions. In such cases the hydrogen is transferred into the ionogenic condition. Apart from a reduction of silver and, therewith, an impairment of the dissolving capacity with respect to olefins, these separations cause troublesome blocking of pumps, valves and tubes in industrial operation. Although the precipitated silver can be isolated by filtering with suction and washing and then be dissolved again, for instance by treatment with oxidizing agents and acids at an elevated temperature, this procedure is very inconvenient for a continuous washing out process by means of silver solution.

It has now been found, as a surprising result, that the precipitation of silver, caused by hydrogen or reducing agents, from aqueous solutions or from anhydrous solutions, for example glycolic solutions or solutions in certain nitriles such as acetonitrile or benzonitrile, can be completely inhibited by the addition of oxidizing agents, if the latter are initially added to the solutions. Such oxidizing agents are, for example, mercury, iron, manganese, chromium, vanadium and copper salts; furthermore metal oxides and peroxides as well as hydrogen peroxide and its derivatives which readily yield hydrogen peroxide, such as isopropyl hydroperoxide, performic acid, peracetic acid, etc. likewise oxygen, ozone or mixtures of oxygen and ozone, and oxidizing acids such as nitric acid, perchloric acid, chromic acid. Acyclic ethers, cyclic ethers such as diethyl ether, tetrahydrofurane and similar compounds that in the presence of oxygen are able of forming peroxides likewise proved to be suitable as additives. Oxygen may be admixed with hydrogen containing gas but, with the same success, it can likewise be contacted separately with the silver solution.

The oxidation agents as well as the substances of lower oxidation stages which are formed therefrom in the course of the reaction shall be soluble as completely as possible in the solutions containing silver salts. In the reaction solution there shall always be present a slight excess quantity of the oxidation agents added. This excess quantity, at the rate at which it is consumed, is maintained at an approximately constant value by the continuous supply of further quantities of oxidation agents.

Generally the oxidizing agents are used—the silver being maintained in ionogenic conditions without showing any signs of precipitation—until they are exhausted. After that, silver slowly separates from the solution. By continuous addition of the oxidizing agent it is possible to operate for any desired period without precipitation of silver. The use of hydrogen peroxide is of particular advantage since in this case the water obtained as reaction product does not contaminate the solution and, if necessary, can easily be removed therefrom. The conditions under which the oxidizing agent inhibits the precipitation of silver do not influence the dissolving capacity of the silver solution with regard to olefins, and do not cause any change in the dissolving operation taking place without addition of oxidizing agents. Under the conditions of the present invention already precipitated silver is slowly dissolved.

In this manner it is possible to extract the olefin quantitatively by means of silver solutions out of waste gases containing hydrogen and relatively small amounts of olefin formed, for instance, in coke ovens, no trouble being caused by large amounts of hydrogen.

The silver solutions according to the present invention may likewise be used for isolating olefins from crack gases. When operating, for instance, with aqueous solutions of silver fluoborate it is of particular advantage to use hydrogen peroxide since the latter is smoothly soluble in aqueous silver fluoborate. Particularly, it could not be expected when using hydrogen peroxide according to the present invention that this would not decompose but would remain stable for a long period of time, in spite of a relatively high concentration of the silver ions of, e.g. 600–1000 grams of silver per liter of solution. Furthermore very small amounts of heavy metal ions, which may be present when working in industrial apparatus made of metal, do not interfere.

The following examples serve to illustrate the invention but they are not intended to limit it thereto:

Example 1

(a) When conducting hydrogen at room temperature through a vessel filled with 10 parts of aqueous silver fluoborate solution of a concentration of 600 grams of silver per liter, silver slowly begins to separate after 30 minutes.

(b) When, under the same conditions, hydrogen is conducted through a vessel filled with 10 parts of silver fluoborate of the same concentration as mentioned under (a) and, moreover, with 1 part of saturated mercuric fluoborate, no precipitation of silver has taken place even after 6 hours.

Example 2

When introducing, as indicated in Example 1a, hydrogen into a vessel filled with 10 parts of silver fluoborate of a concentration of 600 grams of silver per liter and 1 part of hydrogen peroxide of 50% strength, no precipitation takes place even after 300 hours.

Example 3

When conducting a mixture of 90 percent hydrogen and 10 percent air through a solution of 10 parts of silver fluoborate of a concentration of 600 grams of silver per liter and one part of iron-(III)-fluoborate per liter, under the same conditions as in Example 1a, no precipitation is observed after six hours.

Example 4

Through a column filled with Raschig rings there is conducted in counter-current per hour 1 liter of aqueous fluoborate solution of a concentration of 600 grams of silver per liter and 50 liters of a gas containing 70 percent by volume of hydrogen, 10 percent by volume of carbon monoxide and 20 percent by volume of ethylene. The ethylene containing silver solution is subsequently liberated from ethylene by evacuation and again introduced into the column. By continuously adding hydrogen peroxide the silver solution can be used for any desired time without precipitation of silver taking place. The water formed from hydrogen peroxide is likewise removed on evacuation.

*Example 5*

When conducting hydrogen at room temperature through a saturated solution of silver nitrate to which 2 percent by weight of hydrogen peroxide had been added, no precipitation of silver can be observed even after 100 hours.

In a comparison test carried out without addition of hydrogen peroxide the precipitation of silver sets in after only 30 minutes.

*Example 6*

0.5 liter of a solution of silver fluoborate with a silver content of 600 grams/liter is introduced in such a manner that the solution flows through the apparatus four times per hour so that in total 2 liters per hour pass through the apparatus. Through this solution there are conducted in counter-current 100 liters of a gas mixture of 20 percent by volume of propylene and 80 percent by volume of hydrogen, 2 percent by weight of a crude mixture of hydrogen peroxide, acetone and isopropanol having been primarily added to the solution. The silver salt solution saturated with propylene is freed by treatment under reduced pressure from dissolved propylene which, after compression to normal pressure is washed with water. The silver solution circulates for 24 hours during which time no silver is separated off. Without addition of crude hydrogen peroxide a precipitation of silver sets in after only 2 hours.

*Example 7*

To a silver fluoborate solution of a concentration of 600 grams of silver per liter there is added 1 percent by weight of hydrogen peroxide and the solution is used for washing out a gas mixture consisting of 80 percent by volume of hydrogen and 20 percent by volume of ethylene. By treatment under reduced pressure the ethylene is recovered from the silver solution. After removal of the ethylene the silver solution is brought into contact with oxygen and again used for washing out the ethylene. When operating in this manner, no silver has precipitated from the solution even after 14 days.

*Example 8*

Through a column of the type mentioned in Example 4 there are conducted per hour 2 liters of a circulatory aqueous solution of silver fluoborate and mercuric fluoborate containing 600 grams of silver and 60 grams of mercury per liter. This solution is encountered by 50 liters of a gas containing 80 percent by volume of hydrogen and 20 percent by volume of ethylene. The ethylene is recovered from the silver salt solution by evacuation. The regenerated silver salt solution is hourly treated by means of 30 liters of ozonized oxygen with an ozone content of 10 percent by volume, whereby the precipitation of silver can be inhibited for any desired period of time. Without the action of ozonized oxygen the precipitation of silver sets in after about 12 hours.

We claim:

1. A process for improving the stability of an aqueous silver fluoborate solution towards a mixture consisting of hydrogen and carbon monoxide, which comprises adding hydrogen peroxide to the solution and always maintaining a slight excess quantity of hydrogen peroxide in the solution by continuously adding further quantities of hydrogen peroxide at the rate at which it is consumed.

2. A process for maintaining silver in ionic form in a solution containing a silver salt selected from the group consisting of silver nitrate, silver fluoborate, and silver fluosilicate in a solvent selected from the group consisting of water, glycol, acetonitrile, and benzonitrile, said solution being in contact with a reducing agent for silver ion, which process comprises adding hydrogen peroxide to said solution, whereby metallic silver formed by the action of said reducing agent is oxidized, and maintaining a slight excess of hydrogen peroxide by adding further quantities thereof as said hydrogen peroxide is consumed by reaction.

3. A process as in claim 2 wherein said reducing agent for silver ion is a mixture of hydrogen and carbon monoxide.

4. In a process for absorbing olefins from gas mixtures containing the same together with reducing gases by passing said gas mixtures through a solution of a silver salt, the improvement of passing said gas mixtures through a solution of a silver salt selected from the group consisting of silver nitrate, silver fluoborate, and silver fluosilicate and hydrogen peroxide in a solvent selected from the group consisting of water, glycol, acetonitrile, and benzonitrile.

5. A process as in claim 4, wherein said solution is an aqueous solution.

6. A process as in claim 4 wherein said reducing gases are selected from the group consisting of hydrogen, carbon monoxide, and mixtures thereof.

References Cited in the file of this patent

UNITED STATES PATENTS

| | | |
|---|---|---|
| 1,993,686 | Schulenburg | Mar. 5, 1935 |
| 2,370,809 | Morrell et al. | Mar. 6, 1945 |
| 2,386,351 | Schulze | Oct. 9, 1945 |
| 2,419,090 | Rainard | Apr. 15, 1947 |
| 2,763,697 | Hagemeyer et al. | Sept. 18, 1956 |
| 2,897,154 | Low | July 28, 1959 |

OTHER REFERENCES

Maglio: "Antiseptic Soaps," Soap and Sanitary Chemicals, December 1948, pages 44–45.

Uhlig: "Corrosion Handbook," 1948, John Wiley and Sons, page 468.

Handbook of Chemistry by Lange, 8th edition, pages 948–951, pub. by Handbook Publishers Inc., Sandusky, Ohio (1952).